(12) United States Patent
Loh

(10) Patent No.: US 10,394,726 B2
(45) Date of Patent: Aug. 27, 2019

(54) NETWORK OF MEMORY MODULES WITH LOGARITHMIC ACCESS

(71) Applicant: Advanced Micro Devices, Inc., Sunnyvale, CA (US)

(72) Inventor: Gabriel Loh, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 195 days.

(21) Appl. No.: 15/229,708

(22) Filed: Aug. 5, 2016

(65) Prior Publication Data

US 2018/0039587 A1    Feb. 8, 2018

(51) Int. Cl.
*G06F 13/28* (2006.01)
*G06F 13/16* (2006.01)

(52) U.S. Cl.
CPC .......... *G06F 13/1684* (2013.01); *G06F 13/28* (2013.01); *Y02D 10/14* (2018.01)

(58) Field of Classification Search
CPC ...... G06F 12/0835; H04L 49/10; H04L 49/25
See application file for complete search history.

(56) References Cited

U.S. PATENT DOCUMENTS

| | | | | |
|---|---|---|---|---|
| 2001/0043601 | A1* | 11/2001 | Yamano | H04L 12/189 370/390 |
| 2002/0067693 | A1* | 6/2002 | Kodialam | H04L 45/12 370/216 |
| 2010/0061720 | A1* | 3/2010 | Fiaschi | H04L 45/00 398/2 |
| 2015/0195160 | A1* | 7/2015 | Astigarraga | H04L 43/062 370/216 |
| 2016/0012004 | A1* | 1/2016 | Arimilli | G06F 13/4027 710/306 |

* cited by examiner

*Primary Examiner* — Tim T Vo
*Assistant Examiner* — Harry Z Wang
(74) *Attorney, Agent, or Firm* — Liang & Cheng, PC

(57) ABSTRACT

A memory network includes a plurality of memory nodes each identifiable by an ordinal number m, and a set of links divided into N subsets of links, where each subset of links is identifiable by an ordinal number n. For each subset of the plurality of N subsets of links, each link in the subset connects two memory nodes that have ordinal numbers m differing by $b^{(n-1)}$, where b is a positive number. Each of the memory nodes is communicatively coupled to a processor via at least two non-overlapping pathways through the plurality of links.

20 Claims, 5 Drawing Sheets

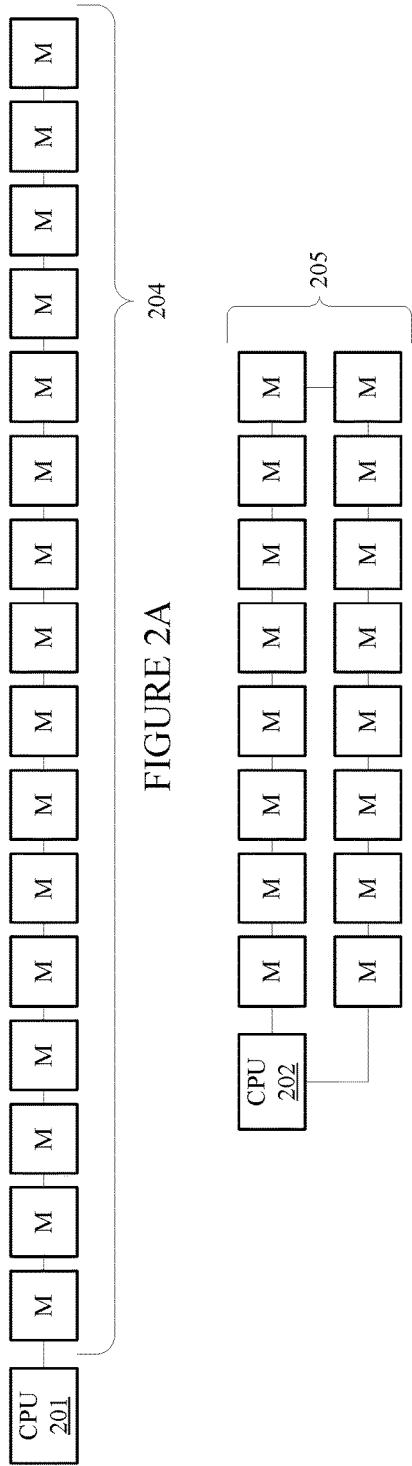
FIGURE 2A
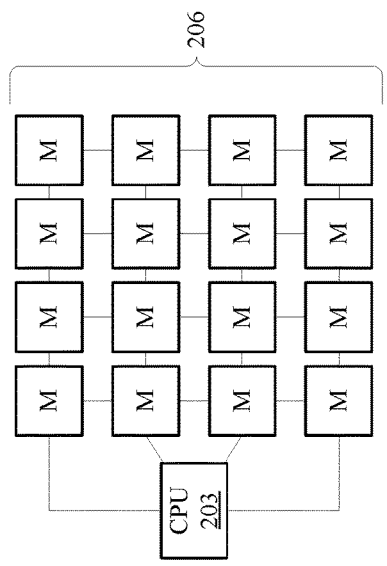
FIGURE 2B
FIGURE 2C

NETWORK OF MEMORY MODULES WITH LOGARITHMIC ACCESS

TECHNICAL FIELD

This disclosure relates to the field of memory and, in particular, to networks of memory modules in a computing system.

BACKGROUND

Modern computer systems utilize memory for storing information for immediate use in calculations and other processes. For example, random access memory (RAM) can be used in a computer system to store data that can be quickly accessed by processes being executed in the computer system. Typically, memory such as RAM in a computer system is implemented using silicon-based transistors and capacitors.

As memory capacities in computer systems increase, alternative topologies can be used to connect memory modules in the computer system. However, topologies having an increased number of memory modules also have a greater number of connections, resulting in greater complexity and increased memory latency that can negatively affect performance.

BRIEF DESCRIPTION OF THE DRAWINGS

The present disclosure is illustrated by way of example, and not by way of limitation, in the figures of the accompanying drawings.

FIGS. 2A-2C illustrate embodiments of memory networks using different topologies.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A computer system may accommodate a large number of memory nodes in a memory network that includes communication links between the memory nodes, such that a processing unit of the computer system is able to access any of the memory nodes either directly or indirectly through one or more intermediate memory nodes. However, as the number of memory nodes (each including one or more memory modules) increases, the complexity of the network and the latency of the memory also increases due to the large number of hops needed to reach the memory nodes farthest from the processing unit.

One embodiment of a computer system utilizes a memory network including memory nodes that are connected with communication links in a hierarchical manner to provide quick access to any of the memory nodes, along with mechanisms to provide additional fault tolerance and/or load balancing through redundant links. In one embodiment, such a memory network is arranged so that communications from a processor of the computer system can reach any memory node in the network by traversing no more than k links in the network, where the number of accessible memory nodes increases exponentially relative to an increase in k. Embodiments utilizing such a network can thus access a large number of memory modules while maintaining a relatively low hop count to minimize memory latency and reduce energy consumption by the memory network.

Figure 1:
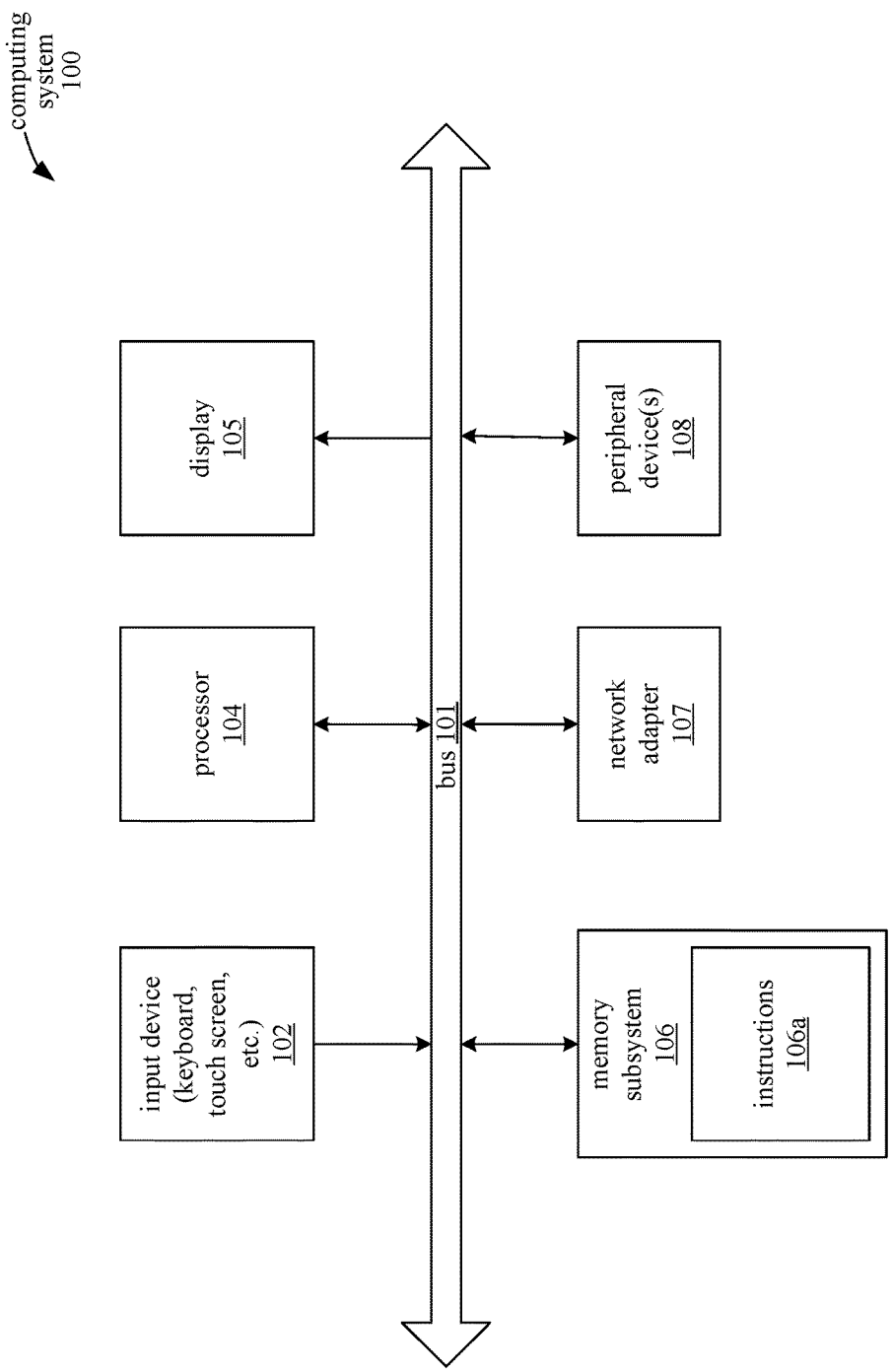
FIG. 1 illustrates an embodiment of a computing system.

FIG. 1 illustrates an embodiment of a computing system 100 which implements a memory network having logarithmic access as described above. In general, the computing system 100 may be embodied as any of a number of different types of devices, including but not limited to a laptop or desktop computer, mobile phone, server, etc. The computing system 100 includes a number of components 102-108 that can communicate with each other through a bus 101 or other interconnects. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 may be embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices that can be used by the computing system 100.

Computing system 100 includes a processor 104 that is configured to receive and execute instructions 106*a* that are stored in the memory subsystem 106. In alternative embodiments, the processor 104 can be any processing element, including but not limited to a graphics processing unit (GPU), an accelerated processing unit (APU), a field programmable gate array (FPGA), a digital signal processor (DSP), or any other application-specific integrated circuit (ASIC).

Memory subsystem 106 includes memory devices used by the computing system 100, such as random-access memory (RAM) modules, read-only memory (ROM) modules, hard disks, and other non-transitory computer-readable media. The memory included in memory subsystem 106 is used as main memory in the computing system 100. Additional types of memory can be included in memory subsystem 106 or elsewhere in computing system 100. For example, cache memory and registers may also be present in the processor 104 or on other components of the computing system 100.

In one embodiment, memory subsystem 106 includes memory nodes that are arranged in a memory network. FIGS. 2A, 2B, and 2C illustrate embodiments of memory networks including memory nodes M arranged in different topologies. FIG. 2A illustrates a processor 201 connected to memory modules 204 in a chain topology. FIG. 2B illustrates a processor 202 connected to memory modules 205 in a ring topology. FIG. 2C illustrates a processor 203 connected to memory modules 206 in a mesh topology. With these topologies, which can be made to include an arbitrarily large number of memory nodes, a relatively small number of connections (e.g., pins) from a processor package can be used to access a large amount of memory. However, certain topologies can suffer from high memory latency due to the large number of links (i.e., high number of hops) to be traversed when the processor communicates with the most distant nodes in the topology.

Figure 3:
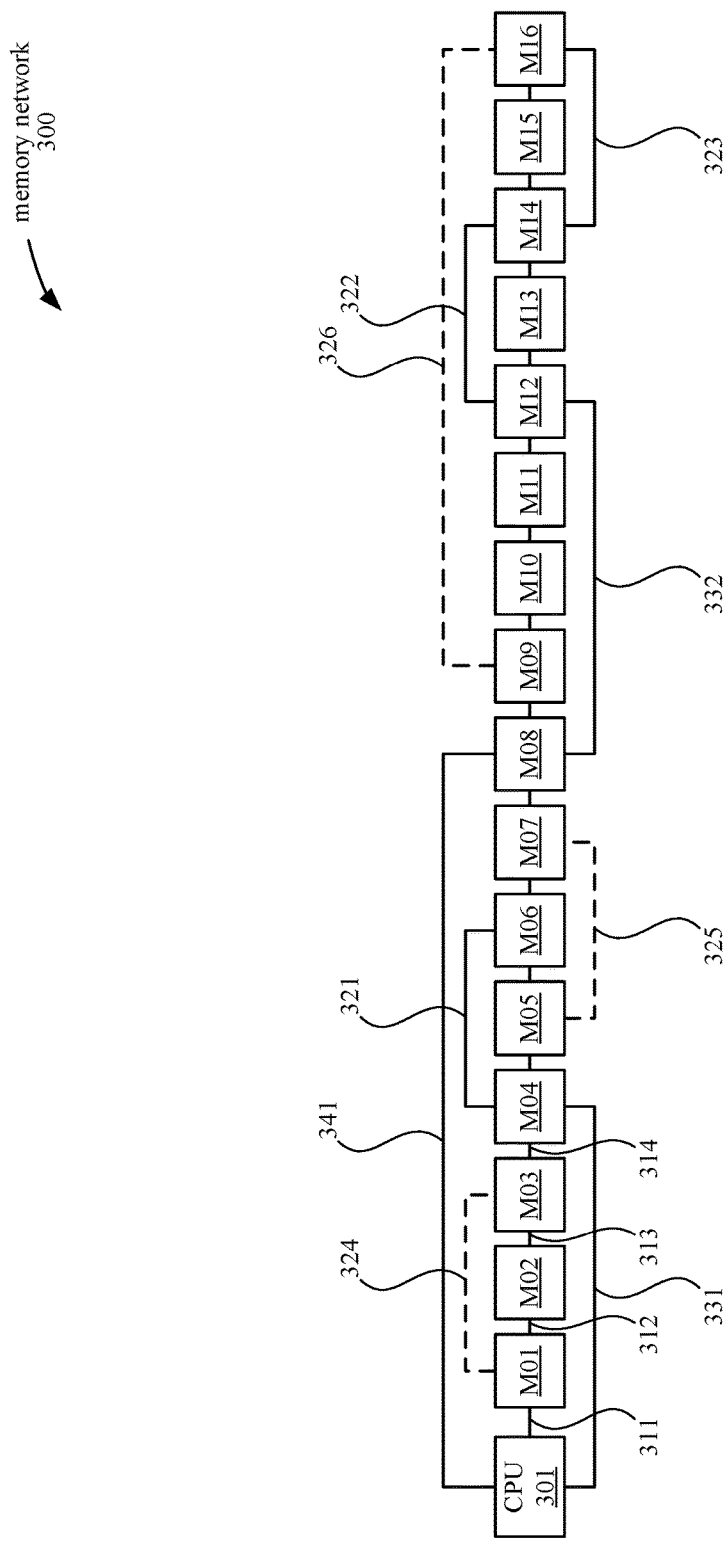
FIG. 3 illustrates an embodiment of a memory network having exponentially varying link lengths.

FIG. 3 illustrates an embodiment of a memory network topology 300 with logarithmic node access. In one embodiment, memory network 300 is implemented in computer system 100 as part of memory subsystem 106. Memory network 300 includes 16 nodes (M01-M16) that are connected to a processor 301 by a number of communication links. In one embodiment, the processor 301 performs a similar function as processor 104 in computing system 100. Processor 301 is a central processing unit (CPU) that is configured to generate memory requests for data from any of the memory nodes M01-M16.

Figure 4:
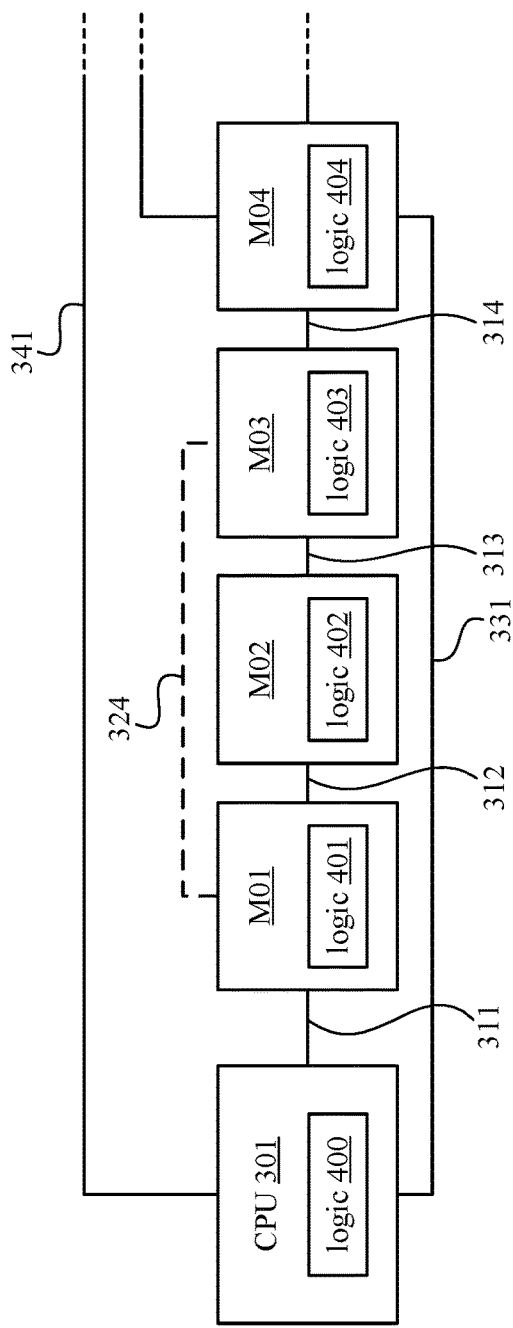
FIG. 4 illustrates a portion of a memory network having exponentially varying link lengths, according to an embodiment.

The memory network 300 also includes memory control logic that controls transmission of the requested data over one or more of the links in response to the memory request from the processor 301. In one embodiment, the memory control logic includes logic (e.g., logic circuits, firmware, etc.) that is integrated in the processor 301 and/or some or all of the memory nodes M01-M16. In other words, embodiments of a memory network 300 may implement all or a portion of the memory control logic in any of the processor 301 and/or memory nodes M01-M16. FIG. 4 illustrates a portion of the memory network 300 according to one embodiment, including memory control logic 400, 401, 402, 403, and 404 located in the CPU 301, and memory nodes M01, M02, M03, and M04, respectively.

Referring back to FIG. 3, each memory node of the 16 memory nodes is designated by an ordinal number m that corresponds to the order of the memory node along the longest (i.e., including the greatest number of links) non-overlapping pathway through the communication links that includes all of the memory nodes M01-M16 in the network 300, with lower ordinal numbers designating nodes that are nearer to the CPU 301 along the pathway. Thus, node M01 has the ordinal number '1', node M02 has ordinal number '2', etc. The CPU 301 can be considered to have an ordinal number of '0'. While the illustrated memory network 300 includes 16 memory nodes M01-M16 and one processor 301, alternative embodiments can have fewer or more of these components.

A first set of communication links in the network 300 can be divided into N subsets of links, with each subset of links being identified by an ordinal number n. Each link in a given subset n connects two memory nodes that have ordinal numbers differing by $b^{(n-1)}$, where b is a positive integer such as 2. For example, when b is equal to 2, each link in a first subset of links connects memory nodes in the network 300 having ordinal numbers differing by $2^{(1-1)}$, or 1. As illustrated in FIG. 3, the first subset of links includes links (e.g., links 312-314, etc.) that connect adjacent memory nodes having incremental ordinal numbers. Accordingly, each link in a second (i.e., n=2) subset of links connects memory nodes having ordinal numbers differing by $2^{(2-1)}$, or 2. In network 300, the second subset of links includes links 321, 322, and 323. For example, link 321 connects nodes M04 and M06, which have ordinal numbers differing by 2 while link 322 connects nodes M12 and M14, having ordinal numbers also differing by 2.

In an alternative embodiment, the base number b is a positive non-integer, for example, b=2.5. Accordingly, the nth subset of links connects nodes having ordinal numbers differing by CEILING($b^{(n-1)}$), where the CEILING function rounds its input up to the nearest integer.

In memory network 300, as illustrated in FIG. 3, N is equal to 4; therefore, the network 300 also includes third (n=3) and fourth (n=4) subsets of links. Links in the third subset each connect memory nodes having ordinal numbers differing by $2^{(3-1)}$, or 4. The third subset of links includes links 331 (connecting the CPU 301 with ordinal number '0' and M04) and 332 (connecting M08 and M12). Links in the fourth subset each connect memory nodes having ordinal numbers differing by $2^{(4-1)}$, or 8. The fourth subset of links includes link 341, which connects the CPU 301 (having ordinal number '0') and memory node M08 (having ordinal number '8').

As a result, each of the memory nodes M01-M16 in the network 300 is communicatively coupled to the CPU 301 via at least two non-overlapping pathways through the different subsets of links. In one embodiment, each subset of links having ordinal number n includes at least one link that is connected to at least one memory node in common with a link from an adjacent subset of links having an ordinal number n±1. As illustrated in FIG. 3, each link in the second (n=2) subset of links (321 and 322) is connected to a node in common with one of the third (n=3) subset of links (331 and 332). For example, links 321 from the second subset and 331 from the third subset are both connected to memory node M04.

In this topology, the shortest communication path between any of the memory nodes M01-M16 and the CPU 301 includes no more than four links. Accordingly, a memory request or other communication from the CPU 301 can reach any of the 16 memory nodes, or vice versa, in no more than four hops. In addition, as a measure of the reduced complexity of this topology, each of the nodes M01-M16 in the network 300 is connected to no more than four links.

In one embodiment, the network 300 also includes auxiliary links 324, 325, and 326 (represented by dashed lines in FIG. 3) in addition to the first set of N subsets of links. The auxiliary links 324-326 connect pairs of memory nodes and provide additional communication routing pathways from the connected nodes to the CPU 301. In memory network 300, the auxiliary links 324-326 are each connected to memory nodes that are already connected to no more than two links from the N subsets of links. Memory network 300, as illustrated in FIG. 3, embodies just one of many possible arrangements of links and memory nodes. Alternative embodiments may exclude the auxiliary links, or may include one or more additional sets of links with a different base number b. For example, a second set of links may exist with a base number b equal to 3, such that each link in a given subset n connects two memory nodes that have ordinal numbers differing by $3^{(n-1)}$.

In one embodiment, the CPU 301 generates a number of memory requests that each request data from one or more of the memory nodes M01-M16. In response to the memory requests, the memory control logic (e.g., logic 400-404 in FIG. 4) controls transmission of the memory requests over the links in the memory network 300. In one embodiment, the memory control logic receives a memory request from the CPU 301 that requests data from a target memory node in the network 300 and, in response to the memory request, routes the memory request to the target node through a pathway including one or more hops between the memory nodes M01-M16. The memory control logic routes the memory request to the target node by, for each hop in the pathway, selecting a longest available link that reaches either the target memory node or a memory node having a lower ordinal number than the target memory node. Generally, the longest link is the link connecting two nodes having the greatest difference in ordinal numbers. A node having a lower ordinal number is reachable from the CPU 301 in fewer hops than a higher-numbered node.

With reference to FIG. 4, for a memory request originating from CPU 301 and requesting data from node M03, logic 400 initially routes the request through link 311, since link 311 is the longest available link that reaches a memory node (M01) having a lower ordinal number than the target node M03. Upon reaching node M01, the memory request is routed according to the same principles by logic 401 to node M02 via link 312, and then is routed by logic 402 to node M03 via link 313, assuming that the auxiliary link 324 is unavailable. The memory control logic at each node thus selects the longest link that does not "overshoot" the target node.

For a memory network that includes active auxiliary links, such as link 324, the same routing process can be followed. For example, at node M01, the logic 401 can route the memory request directly (i.e., without passing through any other nodes) to the target node M03 via the auxiliary link 324 instead of routing the request through link 312, since link 324 is the longer available link that does not overshoot the target node M03.

Once the memory request reaches the target node M03, the target node M03 responds by sending the requested data back to the CPU 301 from which the memory request originated. The memory control logic routes the data by, at each node, selecting the longest available link from the node to a memory node having a lower ordinal number (i.e., is fewer hops from the CPU 301). Continuing the previous example, node M03 responds to the memory request by retrieving the requested data. Memory control logic 403 transmits the data via link 313 to node M02, since link 313 is the longest link from node M03 to a lower-numbered node, assuming that auxiliary link 324 is not available. The logic 402 routes the data to node M01 via link 312, then logic 401 routes the data to CPU 301 via link 311 according to the same principles.

In an embodiment where auxiliary link 324 is active, the memory control logic routes the data from M03 to CPU 301 via links 324 and 311, since auxiliary link 324 is the longest link from node M03 to a lower-numbered node. In one embodiment, each memory node in a memory network having exponentially varying link lengths can be reached in no $\log^b(M)$ hops or fewer, where M is the total number of memory nodes in the network. For example, any of the 16 nodes M01-M16 in network 300 can be reached in no more than $\log_2 (16)$, or 4 hops.

The topology of memory network 300 results in multiple communication pathways from any of the memory nodes M01-M16 to the CPU 301. Thus, in one embodiment, the memory control logic may not necessarily utilize the above-described routing process in every case, but may be adapted to route communications (e.g., memory requests, data, etc.) along alternate links or pathways in order to effect load balancing in the network 300. Thus, communications having the same source and destination may not always travel along the same pathway. Accordingly, requested data may be transmitted via a different return pathway than the original memory request.

In one embodiment, load balancing rules are triggered by detection of an amount of traffic exceeding a threshold amount on one or more of the links. In one embodiment, memory control logic that is performing load balancing selects links for transmitting requested data from a target memory node to the CPU 301 by, for each hop in the return pathway, selecting the available link having the least communication traffic. In particular, the memory control logic in an origin node (e.g., node M03) of a hop selects an available link connected to the origin node that is carrying less communication traffic than any other available link connected to the origin node. The memory control logic then transmits the communication via the selected link to the destination memory node of the hop. A similar selection process is performed for each hop in the pathway until the target node or CPU 301 is reached.

Alternatively, the memory control logic may perform load balancing of communication pathways by selecting one of multiple pathways from the source node to the target node that is carrying the least communication traffic. In some embodiments, the memory control logic may select the pathway having the least traffic from among two non-overlapping pathways that do not have any links in common in order to avoid overloading any common links. With reference to FIG. 3, for example, data transmitted from node M03 to the CPU 301 could be routed through links 314 and 331 to reduce the load on the pathways including links 324, 313, 312, and 311.

In order to select the links and/or pathways having the least traffic, the memory control logic tracks the amount of traffic that has been sent on each link. In one embodiment, the traffic load is averaged over a finite window of time. In an alternative embodiment, the memory control logic distributes traffic over the links is a regular manner (e.g., round robin, or weighted round robin).

In addition to load balancing, the redundant links in the memory network 300 also provide fault tolerance. In network 300, the memory control logic responds to unavailability of one or more links by routing communication traffic through a different pathway. Thus, a node that is accessible through two non-overlapping pathways can still be reached by one of the pathways if unavailability of a link eliminates the other non-overlapping pathway. For example, node M04 can still receive communications from CPU 301 through pathway including links 311-314 or if link 331 becomes unavailable.

The memory network 300 thus tolerates link failures or pruning (e.g., for power-saving reasons) by routing communications through alternate pathways. In some cases, the alternate pathway is longer and results in a greater number of hops for the communication to reach its destination;

however, any degradation in performance may be acceptable to ensure the continued availability of the memory node.

Figure 5:
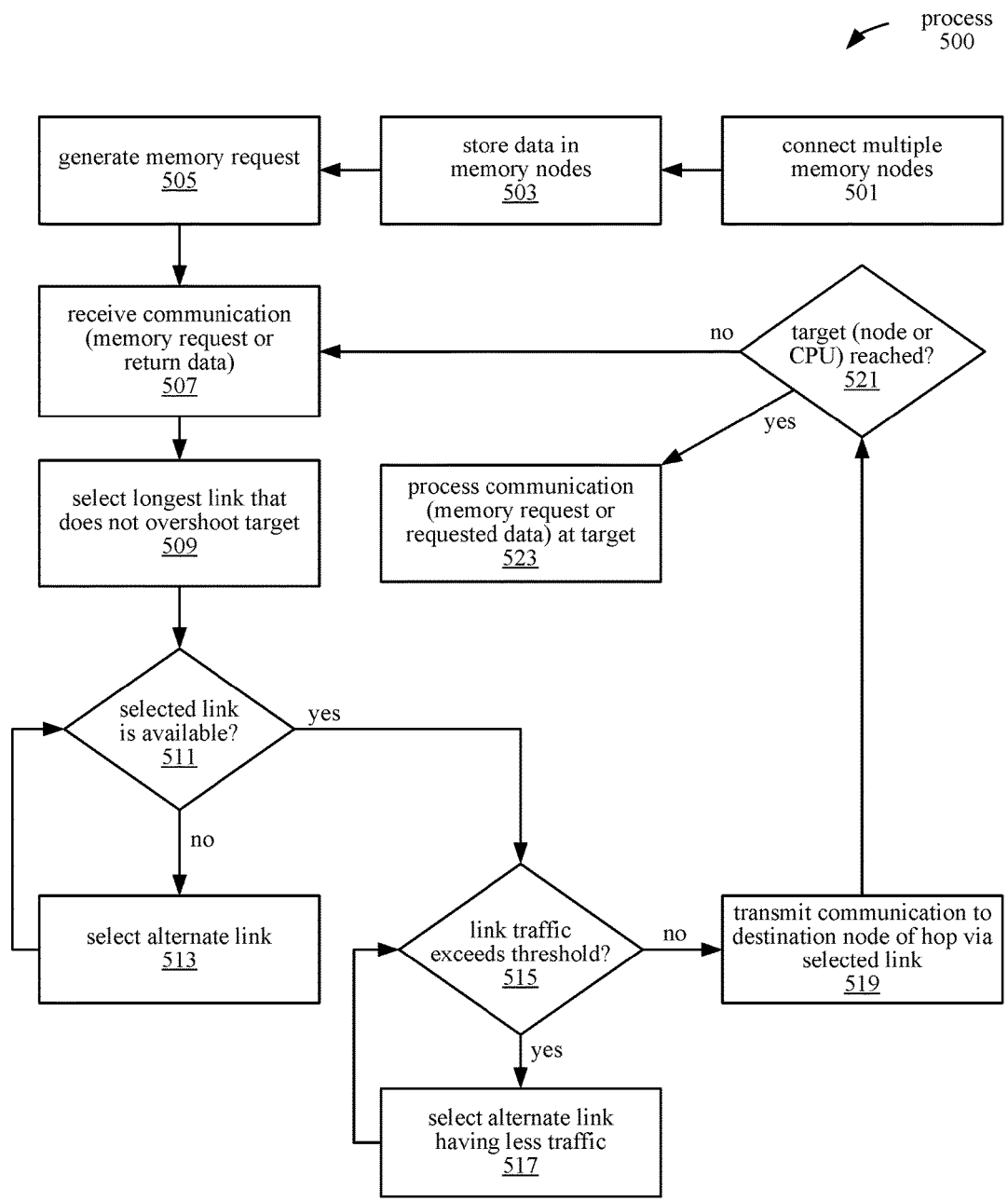
FIG. 5 is a flow diagram illustrating an embodiment of a process of operating a memory network.

FIG. 5 illustrates a process 500 of operating a memory network, according to an embodiment. The process 500 is used in operating a memory network 300, and is performed by components of the network 300, such as the memory control logic 400-404, etc.

The process 500 begins at block 501. At block 501, a set of links in the memory network 300 connects the multiple memory nodes M01-M16 in the network 300. The nodes M01-M16, each identifiable by an ordinal number m, are each communicatively coupled to the CPU 301 via at least two non-overlapping pathways through the links. In one embodiment, the non-overlapping pathways are non-overlapping with respect to each other because they do not include any links in common.

The links in the network 300 are divisible into N subsets of links, with each subset of links identifiable by an ordinal number n. For each of the N subsets of links, each link in the subset connects two memory nodes having ordinal numbers m differing by $b^{(n-1)}$, where b is a positive integer such as 2. In addition, each set of links having ordinal number n includes at least one link that is connected to the same memory node as a link from an adjacent set of links having an ordinal number of n±1.

At block 503, the connected memory nodes are used to store data. Each of the memory nodes may include, for example, one or more volatile or non-volatile memory modules, and may include memory implemented using one or more different memory technologies. These memory nodes retain data that has already been written to the memory nodes (e.g., during a prior invocation of process 500).

At block 505, the CPU 301 generates a memory request to access data stored on one or more target memory nodes of the memory nodes M01-M16. At block 507, the memory control logic 400 in the CPU 301 receives the memory request. In response to receiving the request, the memory control logic 400 initiates the process (including blocks 507-521) for accessing the data from the target memory nodes via one or more of the connected links. In particular, the memory control logic in the network 300 accesses the data by routing the memory request to the target node through a pathway including one or more hops between the memory nodes.

At block 509, the memory control logic 400 routes the memory request to the target memory node by selecting a longest available link for the first hop that reaches either the target memory node or a memory node having a lower ordinal number than the target memory node. In other words, the logic 400 selects the longest link that does not overshoot the destination specified by the memory request.

At block 511, if the selected link is not available (e.g., due to a fault or an intentional pruning), the process 500 continues at block 513. At block 513, the logic 400 selects an available alternate link for the hop. Blocks 513 and 511 are repeated until an available link is selected. The memory control logic in the network 300 thus effects fault tolerance in the routing of communications through the network links. In a memory network 300 where some or all of the memory nodes M01-M16 are each accessible by the processor 301 through multiple non-overlapping pathways (i.e., multiple pathways connecting the processor 301 to the same node have no links in common), the unavailability of one link can result in the unavailability of one of the non-overlapping pathways. The fault tolerance mechanism allows the memory control logic to route communications through a remaining pathway.

From block 511, the process 500 continues at block 515. At block 515, the memory control logic 400 determines whether communication traffic on the selected link exceeds a predetermined threshold. If the traffic on the selected link exceeds the threshold, the memory control logic 400 selects an available alternate link for the hop that has less traffic, as provided at block 517. The process 500 continues back to block 515 to determine whether the traffic for the alternate link exceeds the threshold. Blocks 515 and 517 are repeated until an alternate link is found for which the link traffic does not exceed the threshold. Thus, load balancing among links is implemented by selecting a link for the hop based on the existing traffic load.

In an embodiment of network 300 where some or all of the memory nodes M01-M16 are each connected to the processor 301 via multiple non-overlapping pathways, the selected link only corresponds to one of the multiple non-overlapping pathways connecting a given node to the processor. Accordingly, the selection of the link can determine all or a portion of the non-overlapping pathway through which the communication will be routed. Thus, the memory control logic may also account for the traffic load on other links in the same pathway or portion of a pathway when selecting the first link in a load-balancing implementation. For example, the memory control logic may select, from among two or more non-overlapping pathways, the pathway carrying the least communication traffic over all of its links.

In an alternative embodiment, the memory control logic 400 performs load balancing by comparing the traffic on the available links and selecting the link with the least traffic, instead of selecting a longest link as provided at block 509.

From block 515, the process 500 continues at block 519. At block 519, the memory control logic 400 transmits the memory request to the destination node of the hop over the selected link. If the destination node of the hop is not the target node, then at block 521 the target node is not reached and the process 500 continues back to block 507. Blocks 507-521 are repeated for each hop until target node is reached. In one embodiment, each repetition of blocks 507-521 is performed by memory control logic in the origin node of the hop (i.e., the destination node of the previous hop).

When the memory request reaches the target node, the process 500 continues from block 521 to block 523. At block 523, the target node processes the memory request by retrieving the requested data from its memory.

The requested data is returned to the CPU 301 in similar fashion according to the routing process including repeated iterations of blocks 507-521. At block 507, the memory control logic of the target node from which the requested data was retrieved receives the retrieved data. For example, if the target node is node M03, the data is received at logic 403. At block 509, the memory control logic 403 selects the longest link that is connected to a destination node that is closer to the CPU 301. For example, the logic may select the link connected to the destination node having the lowest ordinal number m. From block 509, the process 500 continues at block 511.

The memory control logic performs the operations of blocks 511 and 513 until the longest available link is selected for the hop. The memory control logic also performs the operations of blocks 515 and 517 as needed in order to load-balance the link traffic. Accordingly, the memory control logic at block 519 transmits the requested data from the target memory node via the selected link to a destination node of the hop. The operations of blocks 507-521 are repeated to select the links for each hop in the return pathway to the CPU 301 until the requested data reaches the CPU 301, as determined at block 521. At block 523, the CPU 301 receives the returned data. The memory network 300 thus operates according to process 500 to store data in the connected memory nodes M01-M16 and return the data in response to memory requests from a processor 301.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the memory network 300 and/or portions thereof carried on the computer-readable storage medium may be a database or other data structure which can be read by a program and used, directly or indirectly, to fabricate the hardware comprising the the memory network 300. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the the memory network 300. The netlist may then be placed and routed to produce a data set describing geometric shapes to be applied to masks. The masks may then be used in various semiconductor fabrication steps to produce a semiconductor circuit or circuits corresponding to the the memory network 300. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A memory network, comprising:
   a processor;
   a plurality of memory nodes coupled with the processor and each identifiable by an ordinal number m; and
   a set of links divided into N subsets of links, each subset of links identifiable by an ordinal number n,
   wherein:
   for each subset of the plurality of N subsets of links, each link in the subset connects two memory nodes of the plurality of memory nodes that have ordinal numbers m differing by $b^{(n-1)}$,
   b is a positive number greater than 1, and
   each of the plurality of memory nodes is communicatively coupled to the processor via at least two non-overlapping pathways through the plurality of links, and
   in response to a memory request directed to a target memory node of the plurality of memory nodes, the processor is configured to select, for routing the memory request, a link to a memory node based on identifying the memory node as having a highest ordinal number that is lower than or equal to an ordinal number of the target memory node.

2. The memory network of claim 1, wherein each subset of links having ordinal number n includes at least one link that is connected to the same memory node as a link from an adjacent subset of links having an ordinal number of n±1.

3. The memory network of claim 1, wherein b is equal to 2 and N is equal to 4, such that the N subsets of links comprises a first subset of links each connecting memory nodes having ordinal numbers differing by 1, a second subset of links each connecting memory nodes having ordinal numbers differing by 2, a third subset of links each connecting memory nodes having ordinal numbers differing by 4, and a fourth subset of links each connecting memory nodes having ordinal numbers differing by 8.

4. The memory network of claim 1, wherein for each memory node of the plurality of memory nodes, a shortest communication path between the memory node and the processor includes no more than four links.

5. The memory network of claim 1, further comprising a set of auxiliary links, wherein for each auxiliary link of the set of auxiliary links, the auxiliary link couples a pair of memory nodes, wherein each memory node of the pair is coupled to no more than two links from the set of links.

6. The memory network of claim 1, wherein:
   the processor is configured to generate a memory read request for data from any of the plurality of memory nodes; and
   the memory network further comprises memory control logic implemented in each of the plurality of memory nodes and configured to control transmission of the requested data over one or more of the plurality of links in response to the memory read request.

7. The memory network of claim 6, wherein:
the processor is further configured to generate a memory write request indicating data to be written at any of the plurality of memory nodes; and
for each memory node of the plurality of memory nodes, the memory control logic of the memory node is further configured to write the data indicated in the memory write request.

8. A memory network, comprising:
memory control logic;
a plurality of memory nodes each identifiable by an ordinal number m and each coupled with the memory control logic; and
a set of links divided into N subsets of links, each subset of links identifiable by an ordinal number n, wherein:
for each subset of the plurality of N subsets of links, each link in the subset connects two memory nodes of the plurality of memory nodes that have ordinal numbers m differing by $b^{(n-1)}$,
b is a positive number greater than 1,
each of the plurality of memory nodes is communicatively coupled to a processor via at least two non-overlapping pathways through the plurality of links, and
the memory control logic is configured to
in response to a memory request directed to a target memory node of the plurality of memory nodes, route the memory request to the target node through a pathway including one or more hops between memory nodes, and
for each hop in the pathway, selecting a link based on identifying the link as a longest available link reaching either the target memory node or a memory node having a lower ordinal number than the target memory node.

9. The memory network of claim 8, wherein the processor is coupled with the memory control logic and is configured to request data from any of the memory nodes.

10. The memory network of claim 8, wherein each of the plurality of memory nodes includes a portion of the memory control logic.

11. The memory network of claim 8, wherein the memory control logic is coupled with each of the plurality of memory nodes and is configured to:
receive the memory request from the processor requesting data from the target memory node, wherein the first link in the pathway is the longest link in the pathway.

12. The memory network of claim 11, wherein the memory control logic is further configured to, in response to the memory request, transmit the requested data from the target memory node to the processor via one of the two non-overlapping pathways having less communication traffic than the other of the two non-overlapping pathways.

13. The memory network of claim 11, wherein the memory control logic is further configured to, in response to the memory request:
transmit the requested data from the target memory node to the processor via a return pathway including one or more hops between memory nodes by, for each hop in the return pathway, selecting an available link from an origin memory node of the hop to a destination memory node having less communication traffic than any other available link from the origin memory node to the destination memory node.

14. The memory network of claim 8, wherein the memory control logic is configured to route communication traffic through one of the at least two non-overlapping pathways in response to unavailability of the other non-overlapping pathway.

15. A method of operating a memory network, comprising:
connecting a plurality of memory nodes each identifiable by an ordinal number m via a set of links divided into N subsets of links, each subset of links identifiable by an ordinal number n, wherein:
for each subset of the set of links, each link in the subset connects two memory nodes of the plurality of memory nodes that have ordinal numbers m differing by $b^{(n-1)}$,
b is a positive number greater than 1, and
each of the plurality of memory nodes is communicatively coupled to a processor via at least two non-overlapping pathways through the plurality of links;
receiving a request to access data stored on a target memory node of the plurality of memory nodes; and
in response to the request, accessing the data by, routing the request via a link to another memory node based on identifying the another memory node as having a highest ordinal number that is lower than or equal to an ordinal number of the target memory node.

16. The method of claim 15, wherein each subset of links having ordinal number n includes at least one link that is connected to the same memory node as a link from an adjacent subset of links having an ordinal number of n±1.

17. The method of claim 15, wherein accessing the data further comprises routing the memory request to the target node through a pathway including one or more hops between memory nodes by:
for each hop in the pathway, selecting a longest available link reaching either the target memory node or a memory node having a lower ordinal number than the target memory node.

18. The method of claim 17, further comprising, in response to the memory request, transmitting the requested data from the target memory node to the processor via one of the two non-overlapping pathways having less communication traffic than the other of the two non-overlapping pathways.

19. The method of claim 17, further comprising, in response to the memory request:
transmitting the requested data from the target memory node to the processor via a return pathway including one or more hops between memory nodes by, for each hop in the return pathway, selecting an available link from an origin memory node of the hop to a destination memory node having less communication traffic than any other available link from the origin memory node to the destination memory node.

20. The method of claim 15, further comprising routing communication traffic through one of the at least two non-overlapping pathways in response to unavailability of the other non-overlapping pathway.

* * * * *